(No Model.)
J. BRAUN.
LAWN MOWER.
No. 542,235.                    Patented July 9, 1895.
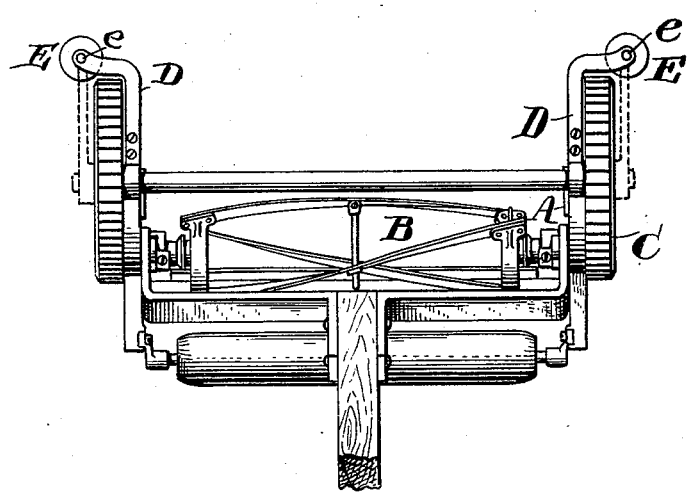
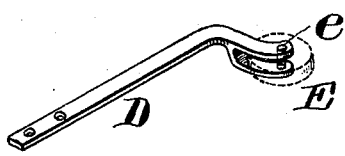
WITNESSES:                              INVENTOR:

UNITED STATES PATENT OFFICE.

JOHN BRAUN, OF PHILADELPHIA, PENNSYLVANIA.

LAWN-MOWER.

SPECIFICATION forming part of Letters Patent No. 542,235, dated July 9, 1895.

Application filed August 30, 1894. Serial No. 521,660. (No model.)

*To all whom it may concern:*

Be it known that I, JOHN BRAUN, of the city and county of Philadelphia and State of Pennsylvania, have invented an Improvement in Lawn-Mowers, of which the following is a specification.

My invention has reference to lawn-mowers; and it consists of certain improvements which are fully set forth in the following specification and shown in the accompanying drawings, which form a part thereof.

My improvement comprehends more particularly a suitable guard for a lawn-mower structure adapted to protect the operative parts of the lawn-mower when cutting grass about obstructions, such as tombstones, fences, walls, &c.

In carrying out my invention I provide the frame of the lawn-mower with suitable supports extending forward and to the outer and forward edges of the wheels or operative structure of the lawn-mowers, and arrange in said supports suitable buffers, preferably in the form of rollers, of rubber or other soft material, pivoted upon substantially vertical axes. With such construction the lawn-mower is protected from in front and from the sides, so that it may be operated with safety directly toward an obstruction, or moved parallel to it without danger of injury.

My invention will be better understood by reference to the accompanying drawings, in which—

Figure 1 is a plan view of a lawn-mower embodying my improvements, and Fig. 2 is a perspective view of one of the roller fenders or guards removed.

A is the main frame of the machine.

B is the rotary cutter, and C are the outer wheels, which operate the gearing for the rotary cutter-blades.

It is immaterial what the details of construction of the lawn-mower proper may be, as my invention is adapted to any of the lawn-mowers heretofore upon the market.

D are two supports respectively secured to the main frame of the machine, and each has its forward end projected laterally and outward to form a bearing for a pivot-pin $e$, which acts as the axis of the buffer or guard-roller E. The ends of the supports D may be forked, as clearly shown in Fig. 2, to receive the rollers E. The rollers E may be formed of rubber, wood, or even metal, if desired, but I prefer to employ rubber. The buffer-rollers are supported upon vertical axes, or those which have a more or less upright position, so that the rollers may readily revolve if they strike obstructions. Furthermore, it will be seen that the buffer-rollers are supported clear of the ground and do not act in any manner to support or guide the cutter of the mower.

It will be seen that by this construction the rollers are arranged on the outer and forward corners of the machine and in a position to protect the mower when moved forward against an obstruction, such as a wall or tombstone, and also laterally when the lawn-mower is moved parallel to the wall or tombstone. The rollers act as buffers if the machine is moved directly on to the obstruction, and as guides if moved parallel to the obstruction. The rollers may be adapted to rotate so that they revolve freely about vertical axes when brought into contact with a fence or wall at the side of the machine.

The frame D may be made U-shaped, if desired, as indicated in dotted lines, so as to have a support upon each side of the power-wheel C.

I do not confine myself to the minor details of construction, as they may be modified in various ways without departing from the principle of my invention.

What I claim as new, and desire to secure by Letters Patent, is—

1. The combination of a lawn mower with a fender or guard consisting of a frame or support secured thereto and extending forward to the outer edge of the power wheel and having a suitable buffer consisting of a pivoted roller movable about an upright axis and carried thereby so as to protect the mower upon its forward and lateral portions.

2. The combination of a lawn mower with a fender or guard consisting of a frame or support extending forward and to the outer edge of the power wheel and having a suitable buffer consisting of a pivoted roller of rubber or soft material movable about an upright axis secured thereto so as to protect the mower upon its forward and lateral portions.

In testimony of which invention I have hereunto set my hand.

JOHN BRAUN.

Witnesses:
JESSE GILBERT,
R. M. HUNTER.